United States Patent [19]
Lofquist

[11] 3,892,525
[45] July 1, 1975

[54] TERTIARY ALKANOLAMINES TO REDUCE OZONE FADING OF DYED POLYAMIDE FIBERS

[75] Inventor: Robert Alden Lofquist, Richmond, Va.

[73] Assignee: Allied Chemical Corporation, Petersburg, Va.

[22] Filed: Oct. 30, 1972

[21] Appl. No.: 302,385

[52] U.S. Cl. .................. 8/165; 8/74; 117/138.8 N; 117/139.5 A
[51] Int. Cl. ............................................. D06p 5/02
[58] Field of Search ........... 8/165, 74; 117/138.8 N, 117/139.5 A

[56] References Cited
UNITED STATES PATENTS

| | | | |
|---|---|---|---|
| 2,132,074 | 10/1938 | Kartaschoff et al. ..................... | 8/74 |
| 3,794,464 | 2/1974 | Lofquist et al. ......................... | 8/165 |

*Primary Examiner*—Stephen J. Lechert, Jr.
*Attorney, Agent, or Firm*—Richard A. Anderson

[57] ABSTRACT

When from about 0.3% to about 8% of tertiary amines formed by the reaction between
- I (A) diepoxides and/or polyepoxides and (B) secondary amines, or between
- II (A) diepoxides and (B) ammonia, primary amines, and/or primary tertiary diamines are coated on nylon fiber, or are added to the dyebath or are coated on dyed fibers, improved dyefastness to ozone is obtained compared to an untreated dyed nylon fiber.

2 Claims, No Drawings

TERTIARY ALKANOLAMINES TO REDUCE OZONE FADING OF DYED POLYAMIDE FIBERS

CROSS-REFERENCE TO RELATED APPLICATION

This application is a companion case to an application filed by Robert Alden Lofquist and Peter Reginald Saunders, Ser. No. 302,384, filed on Oct. 30, 1974, even date with this application and herewith incorporated by reference.

BACKGROUND OF THE INVENTION

The object of this invention is to reduce or prevent the fading of dyed nylon fabrics caused by the presence of ozone. By "fading" is meant the decrease in concentration of a dye in the fiber such that the fiber becomes less intensely colored or changes color, for example, dark blue to light blue, or green to yellow, because of the loss of a blue dye.

Ozone is normally present in air at sea level at concentrations of about 1 to 5 parts per hundred million. Despite this extremely low concentration, severe fading caused by ozone has been observed.

Ozone is an allotropic form of oxygen. The molecule of ordinary oxygen consists of two atoms of oxygen whereas the molecule of ozone is formed from three atoms of oxygen. Ozone is created in the upper atmosphere by the action of high energy radiation from the sun splitting oxygen molecules into separate oxygen atoms. The individual atoms then combine with diatomic oxygen molecules ($O_2$) to form triatomic ozone ($O_3$). This ozone then diffuses down through the atmosphere.

Ozone is a vigorous electrophilic reagent, that is, it acts by sharing electrons which previously belonged exclusively to another molecule (See C. K. Ingolds, "Structure and Mechanism in Organic Chemistry", Cornell University Press, 1953, page 201). An example of this sharing is the attack of ozone on a carbon-carbon double bond to form an ozonide.

When ozone attacks a dye, it can attack at a double bond in the dye or at an amine nitrogen, or other sites where there are electron pairs available. The dyes which are attacked are usually anthraquinone type dyes. Lebensaft, in his doctoral dissertation (University of North Carolina at Greensboro, 1970) stated that ozone attacks the anthraquinone nucleus to form derivatives of phthalic acid.

Disperse type dyes and cationic dyes are those most frequently attacked, but under severe conditions, it is believed that almost all dyes are affected by ozone.

It is believed that the dye diffuses through the fiber to contact the ozone at the surface of the fiber, rather than ozone diffusing through the fiber to a relatively immobile dye. Part of the evidence for this is that any physical treatment to the fiber that increases the mobility of the dye, increases its ozone fading. For this reason, it is felt that any protective agent must also be able to diffuse through the fiber, if it does not form an impenetrable film on the surface of the fiber.

There is some evidence that water molecules must be present in the nylon fiber in order for ozone fading to take place, but whether its action is that of a swelling agent or whether it is involved in a primary or secondary oxidation step is unclear. Lebensaft, cited above, believed it functions principally as a swelling agent and a carrier.

Ozone fading can be decreased by reduction of the specific surface of the yarn. This reduction is undesirable in end-uses that need a bulky yarn. Ozone fading is also diminished by changes in polymer morphology and orientation, but these techniques are inherently expensive.

SUMMARY OF THE INVENTION

A method and composition have been found for improving the fastness of dyes when exposed to ozone in polycarbonamide fibers. The method consists of exposing the fibers to ozone in the presence of a compound selected from the group consisting of compounds having at least two

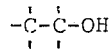

groups attached to nitrogen atoms created by (A) the reaction between diepoxides and ammonia, primary alkyl amines, secondary alkyl amines, or primary-tertiary alkyl diamines, or (B) created by the reaction between polyepoxides and secondary alkyl amines.

Primary amines mentioned above include alkylamines such as hexylamine, alkanolamines such as ethanolamine or tris-(hydroxymethyl)-aminomethane. Di-primary amines include 1,6-hexanediamine, 1,3-diamino-2-hydroxypropane, m-xylylene-diamine, bis-(2-aminoethyl)-sulfide, N,N'-bis-(2-aminopropyl)-piperazine, N,N-bis-(3-aminopropyl)methylamine, and polyoxypropyleneamines such as Jeffamine D230, from Jefferson Chemical Co.

Polyprimary amines include NC-1999 from Dow Chemical Company, a triamine derived from glycerine.

Secondary amines include dimethylamine, diethanolamine, N-ethylethanolamine and dibenzylamine.

Secondary-secondary diamines include N,N'-dimethylethylenediamine, 1,3-di-(4-piperidyl)-propane, and piperazine.

Primary-secondary diamines include N-(2-aminoethyl)piperazine, N-(2-hydroxyethyl)-1,3-diaminopropane, aminoethyl-ethanolamine, and N-methyl-1,3-propanediamine.

Primary-tertiary diamines include N,N-dimethylaminopropylamine, N-(3-aminopropyl)-diethanolamine, N-(3-aminopropyl)-piperidine.

Diepoxides include butadiene dioxide, vinyl cyclohexane dioxide; dipentene dioxide, the diglycidyl ether of bisphenol A and diglycidyl ether, and 1,4-butanedioldiglycidyl ether.

Polyepoxides include glycidyl ethers of novalaks such as Dow's D.E.R. 431; Shell's EPON 1031, the tetraglycidyl ether of 1,1,2,2-tetrakis(4-hydroxyphenyl) ethane; and the triglyclydyl ether of 1,3,5-trihydroxybenzene.

The reaction between amines having an N—H bond and compounds having the

ring creates new compounds having the structure

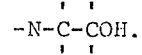

Schechter, Wynstra and Kurkjy reported in Volume 48, No. 1, pages 94–97 of "Industrial and Engineering Chemistry" that primary amines and phenyl glycidyl ether react together to form β-hydroxy alkylamines almost quantitatively. They found that the reaction between equimolar amounts of phenyl glycidyl ether and diethanolamine was so exothermic that the experiment was uncontrollable, but analysis showed that the epoxide was completely consumed and the theoretical amount of tertiary amine had been formed.

Chapman, Isaacs and Parker in the *Journal of the Chemical Society Transactions*, volume 195, pp. 1925–35 reported that the mechanism is a simple, second order, nucleophilic displacement of oxygen by the nitrogen, usually on the carbon with the fewest substituents, i.e., most hydrogens. They feel it is probably due to steric factors, there being more room for the bulky secondary amine where there are fewer or smaller substituents.

Iwakura and Matsuzaki reported in Kobunshi Kagaku, Volume 17, pp. 703–709 (1960), that primary amines act as difunctional compounds and primary diamines as tetrafunctional compounds in their reactions with epoxides. They found that diepoxy compounds with primary monoamines and secondary diamines produced linear polymers, soluble in organic solvents.

The reaction between the epoxides and amines does not occur in the absence of polar solvents when the amine compound does not have hydroxyl substituents. For this reason, and to moderate any exotherm, all the reactions listed in the examples were conducted in water or an alcohol. Schecter, Wynstra and Kurkjy, quoted above, found that the hydrogen donor, i.e., the alcohol or water, does not end up as part of the product.

The product of the above reactions or mixtures of the above compounds can be coated on nylon fibers before or after dyeing, or in the dyebath in amounts of from about 0.1 to about 8%, preferably 0.3 to about 4% on the weight of the fiber.

The rate of fading of the dye or dyes, especially disperse or cationic dyes, is substantially reduced by the incorporation or coating of these β-hydroxyalkylamine compounds. These compounds are effective without discoloring the yarn and with little or no effect on the shade of the dyed fiber.

DESCRIPTION OF THE PREFERRED EMBODIMENTS

Some of the preferred embodiments of this invention are set forth in the following examples. The method of testing the degree of sensitivity to ozone fading was similar to the AATCC 129-1968 test method set forth on page 334/15 of the *Journal of the American Association of Textile Chemists and Colorists*, July 30, 1969, Volume 1, No. 16 in an article entitled, "A New Test Method For Ozone Fading at High Humidity", by Victor s. Salvin.

Following are examples of the reaction between dialkylamines and diepoxides.

EXAMPLE 1

A 250 ml, 3-necked round-bottom flask was equipped with a condenser, a dropping funnel and a thermometer. The weight of amine listed below was introduced and 100 ml of the solvent listed below. The solution was stirred by means of a magnetic stirrer. The Table for Example 1

| Reaction | Amine | Solvent | Epoxide | Description of Product |
|---|---|---|---|---|
| 1a | 45 gms (0.4 equiv.) dimethylamine (40% solution) | 100 ml water | 28.4 gms (0.4 equiv.) 1,2,7,8-diepoxyoctane | amber solid |
| 1b | 45 gms (0.4 equiv.) dimethylamine (40 % solution) | 100 ml water | 28.0 gms (0.4 equiv.) vinylcyclohexane dioxide | amber viscous liquid |
| 1c | 78.9 gms (0.4 equiv.) dibenzylamine | 100 ml water | 35 gms (0.5 equiv.) vinylcyclohexane dioxide | amber fluid |
| 1d | 78.9 gms (0.4 equiv.) dibenzylamine | 100 ml ethanol | 35 gms (0.5 equiv.) 1,2,7,8-diepoxyoctane | light yellow solid |
| 1e | 35 gms (0.31 equiv.) dimethylamine (40% solution) | 100 ml ethanol | 35 gms (0.5 equiv.) vinylcyclohexane dioxide | amber liquid |
| 1f | 35 gms (0.31 equiv.) dimethylamine (40% solution) | 100 cc water | 28.4 gms (0.4 equiv.) 1,2,7,8-diepoxyoctane | amber fluid |
| 1g | 45 gms (0.4 equiv.) dimethylamine (40% solution) | 100 cc water | 28.0 gms (0.4 equiv.) vinylcyclohexane dioxide | amber viscous liquid | epoxide was put in the dropping funnel, and added with vigorous stirring at the rate of about three drops per second.

When all the epoxide was added, the flask was heated to reflux and the contents refluxed for 1 hour. Then the reflux condenser and the separatory funnel were removed, and the solvent was removed by distillation under vacuum.

In a later example, it will be shown that an exact equivalence of amine and epoxide is not required to achieve good ozone fading protection. One gram of phenol was added to the solvent as a catalyst in reaction 1g.

EXAMPLE 2

The following are examples of the reaction between alkylalkanolamines and diepoxides. The apparatus and the technique used to make these materials were the same as those of Example 1.

Table for Example 2

| Reaction | Amine | Solvent | Epoxide | Description of Liquid Product |
|---|---|---|---|---|
| 2a | 30 gms (0.4 equiv.) 2-(methylamino)ethanol | 100 cc water | 35.5 gms (0.5 equiv.) 1,2,7,8-diepoxyoctane | light amber viscous |
| 2b | 30 gms (0.4 equiv.) 2-(methylamino)ethanol | 100 cc water | 35 gms (0.5 equiv.) vinylcyclohexane dioxide | amber viscous |

Table for Example 2

| Reaction | Amine | Solvent | Epoxide | Description of Liquid Product |
|---|---|---|---|---|
| 2c | 30 gms (0.4 equiv.) 2-(methylamino)ethanol | 100 cc water | 28 gms (0.4 equiv.) vinylcyclohexane dioxide | amber viscous |
| 2d | 30 gms (0.4 equiv.) 2-(methylamino)ethanol | 100 cc water | 28.4 gms (0.4 equiv.) 1,2,7,8-diepoxyoctane | amber viscous |
| 2e | 30 gms (0.4 equiv.) 2-(methylamino)ethanol | 100 cc ethanol | 67 gms Eponite 100. | pale yellow viscous |
| 2f | 37.8 gms (0.25 equiv.) N-benzylethanolamine | 100 cc water | 12 gms (0.25 equiv.) 1,2,3,4-diepoxybutane | dark viscous |
| 2g | 15 gms. (0.2 equiv.) 2-methylamino)ethanol | 100 cc ethanol | 33.5 gms Eponite 100 | pale yellow viscous |
| 2h | 15 gms (0.2 equiv.) 2-methylamino)ethanol | 100 cc i-propanol | 33.5 gms Eponite 100 | pale yellow viscous |
| 2i | 15 gms (0.2 equiv.) 2-methylamino)ethanol | 100 cc t-butanol | 33.5 gms Eponite 100 | pale yellow viscous |
| 2j | 30 gms (0.4 equiv.) 2-methylamino)ethanol | 100 cc ethanol | 67 gms Eponite 100 | pale yellow viscous |

Eponite 100 is manufactured by Shell Chemical Company. It is a diepoxide, analyzed at 167 grams per epoxide group. Reactions 2g, 2h, and 2i were run to discover whether the solvent had any effect. Reaction 2j was run with one gram phenol to discover whether a phenolic catalyst had any effect on the effectiveness of the product as an antiozonant (See Example 20a).

EXAMPLE 3

The following are examples of the reaction between dialkanolamines and diepoxides. The procedure was the same as in Example 1.

reaction in Examples 3h and 3j. D.E.R. 332 is pure liquid diglycidyl ether of bisphenol A, with an epoxy equivalent weight of 170, made by Dow Chemical Company. ERL 2772 is a low viscosity diglycidyl ether of bisphenol A made by Union Carbide, having an epoxy equivalent weight of 170. D.E.R. 736 is the diglycidyl ether of tetrapropylene glycol, made by Dow Chemical Company.

The last three examples were done to discover the effect of varying the ratio of amine to epoxide.

Table for Example 3

| Reaction | Amine | Solvent | Epoxide | Description of Liquid Product |
|---|---|---|---|---|
| 3a | 42.1 gms (0.4 equiv.) diethanolamine | 100 cc water | 35.5 gms (0.5 equiv.) 1,2,7,8-diepoxyoctane | yellow-amber viscous |
| 3b | 42.1 gms (0.4 equiv.) diethylanolamine | 100 cc water | 35 gms (0.5 equiv.) vinylcyclohexane dioxide | golden viscous |
| 3c | 53.3 gms (0.4 vquiv.) diisopropanolamine | 100 cc water | 35 gms (0.5 vquiv.) vinylcyclohexane dioxide | yellow amorphous semi-solid |
| 3d | 53.3 gms (0.4 equiv.) diisopropanolamine | 100 cc water | 28 gms (0.4 equiv.) vinylcyclohexane dioxide | yellow amorphous semi-solid |
| 3e | 42.1 gms (0.4 equiv.) diethanolamine | 100 cc ethanol | 67 gms (0.4 equiv.) Eponite 100 | pale yellow viscous |
| 3f | 53.3 gms (0.4 vquiv.) diisopropanolamine | 920 cc water | 28 gms (0.4 vquiv.) vinylcyclohexane 4ioxide | yellow 5iscous |
| 3g | 29k00042gms (0.2 vquiv.) diethanolamine | 120 cc ethanol | 34 gms (0.2 equiv.) D.E.R. 332 | colorless crystalline solid |
| 3h | 21 gms (0.2 equiv.) diethanolamine | 100 cc ethanol | 34 gms (0.2 equiv.) D.E.R. 332 | colorless crystalline solid |
| 3i | 26.6 gms (0.2 equiv.) diisopropanolamine | 100 cc ethanol | 34 gms (0.2 equiv.) D.E.R. 332 | colorless crystalline solid |
| 3j | 26.6 gms (0.2 equiv.) diisopropanolamine | 100 cc ethanol | 34 gms (0.2 equiv.) D.E.R. 332 | colorless crystalline solid |
| 3k | 21 gms (0.2 equiv.) diethanolamine | 100 cc ethanol | 34 gms (0.2 equiv.) ERL 2772 | light yellow crystalline solid |
| 3l | 21 gms (0.2 equiv.) diethanolamine | 100 cc ethanol | 27 gms (0.2 equiv.) D.E.R. 736 | light yellow viscous |
| 3m | 26.3 gms (0.25 equiv.) diethanolamine | 100 cc ethanol | 27.6 gms (0.162 equiv.) D.E.R. 332 | colorless crystalline solid |
| 3n | 26.3 gms (0.25 equiv.) diethanolamine | 100 cc ethanol | 21.2 gms (0.125 equiv.) D.E.R. 332 | light yellow crystalline solid |
| 3o | 21.0 gms (0.20 equiv.) diethanolamine | 100 cc ethanol | 27.2 gms (0.160 equiv.) D.E.R. 332 | colorless crystalline solid |

One gram of phenol was added to the solvent, as a catalyst for the reaction in Example 3f, 1 gram of salicyclic acid was added to the solvent as a catalyst for the

EXAMPLE 4

The following are examples of the reaction between secondary amines and polyepoxides.

Table for Example 4

| Reaction | Amine | Solvent | Epoxide | Description of Product |
|---|---|---|---|---|
| 4a | 16.8 gms (0.15 vquiv.) dimethylamine (40% solution) | 100 cc ethanol | 43.2 gms (0.15 vquiv.) EPON 1031 | dark viscous liquid |

Table for Example 4—Continued

| Reaction | Amine | Solvent | Epoxide | Description of Product |
| --- | --- | --- | --- | --- |
| 4b | 15 gms (0.2 equiv.) 2-methylamino ethanol | 100 cc ethanol | 35 gms (0.2 equiv.) D.E.N. 431 | pale yellow semi-solid |
| 4c | 21 gms (0.2 equiv.) diethanolamine | 100 cc ethanol | 57.6 gms (0.2 vquiv.) EPON 1031 | red-amber ]morphous solid |
| 4d | 21 gms (0.2 equiv.) diethanolamine | 100 cc ethanol | 32.8 gms (0.2 equiv.) EPON 812 | pale yellow viscous liquid |
| 4e | 21 gms (0.2 equiv.) diethanolamine | 100 cc ethanol | 35 gms (0.2 5quiv.) D.E.N. 431 | pale qvllow semi-solid |

D.E.N. 431 is Dow Chemical Company's polyglycidyl ether of phenol-formaldehyde novolak; the weight per epoxide was found to be 175 grams. EPON 1031 is made by Shell Chemical; it is the tetraglycidyl ether of tetraphenylethane. Its weight per epoxide was found to be 288 grams. EPON 812 is the triglycidyl ether of glycerol, manufactured by Shell Chemical Company. It was analyzed to have an epoxy equivalent weight of 164 grams.

EXAMPLE 5

The following are examples of the reaction between primary amines and diepoxides.

The product of reaction 4e has a multiplicity of nitrogens with three times as many hydroxyls as nitrogens.

The "Handbook of Epoxy Resins" by H. Lee and K. Neville, McGraw-Hill Book Company, New York, 1967, is a useful reference, especially Chapter 5, "Epoxy-Resin Curing Mechanism". Chapters 7, 8 and 9 describe primary and secondary amines which can be reacted with epoxides. Chapter 5 includes a table of commercially available epoxy resins, that is, monoepoxides, diepoxides, and polyepoxides.

The chemicals made by the reactions described above were tested on dyed sleeves, by coating the sleeves with the chemicals, exposing the sleeves to Table for Example 5

| Reaction | Amine | Solvent | Epoxide | Description of Product |
| --- | --- | --- | --- | --- |
| 5a | 20.2 gms (0.4 equiv.) n-hexylamine | 100 cc water | 28.4 gms (0.4 equiv.) 1,2,7,8-diepoxyoctane | light amber semi-solid |
| 5b | 15 gms (0.4 equiv.) 1-amino-2-propanol | 100 cc water | 28.4 gms (0.4 equiv.) 1,2,7,8-diepoxyoctane | light yellow semi-solid |
| 5c | 21 gms (0.4 equiv.) 2-amino-2-methyl-1,3-propanediol | 100 cc water | 28.4 gms (0.4 equiv.) 1,2,7,8-diepoxyoctane | colorless amorphous solid |

EXAMPLES 6–7

Example 6 is an example of a primary-tertiary diamine reacted with diepoxides.

Example 7 is an example of ammonia reacted with a diepoxide.

ozone and then measuring the loss of color.

EXAMPLE 8

Cationic dyeable polycaprolactam was made having a formic acid relative viscosity (FAV) of about 60, and Table for Examples 6 and 7

| Reaction | | | | |
| --- | --- | --- | --- | --- |
| Example 6 | 13.02 gms (0.2 vquiv.) N,N-dimethyl-1,3-diaminopropane | 100 cc ethanol | 33.5 gms (0.2 vquiv.) [ | yellow ]morphous |
| Example 7 | 7.6 cc of 0% MMONIA (0.33 vquiv.) | 100 cc ethanol | 67 gms (0.2 vquiv.) Eponite 100 | viscous light 8ellow liquid |

The molecules in the above reactions vary from two nitrogens and two hydroxyls as with the product of reaction 1a:

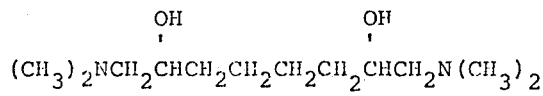

to two nitrogens and four hydroxyls as with the product of reaction 2a:

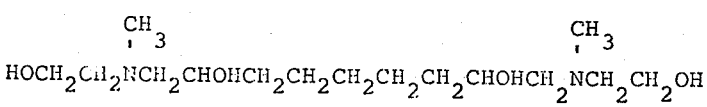

to two nitrogens and six hydroxyls as with the product of reaction 3g:

containing about 90 equivalents of sulfonate pendant to the polymer chain, the sulfonates being provided by the introduction of 5-sulfoisophthalic acid sodium salt to the monomer prior to polymerization. The polymer had about 80 gram-equivalents of carboxyls and about 20 gram-equivalents of amines per $10^6$ grams of polymer. The polymer was spun at 280°C., plied, drawn at a draw ratio of 31.0, crimped and then chopped into 7-inch lengths, carded and spun into staple yarn with a cotton count of 2.0. Each filament of the yarn had a Y-cross section with a 3.2 modification ratio. The yarns

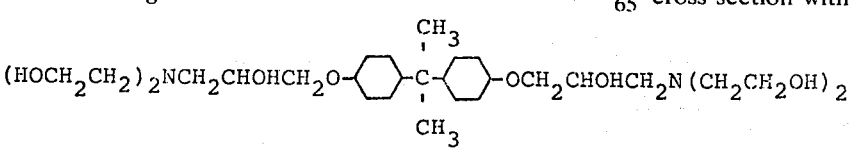

were knitted into sleeves, and then dyed to a moss green in a dyebath, containing 0.3 percent (O.W.F) Sevron Yellow 8 GMF, 0.25% Astrazon Blue 3RL (C.I. Basic Blue 47), 2% Hypochem PND-11, 1% Hypochem CDL-60, and enough mono- and/or disodium phosphate to adjust the pH to neutral.

The sleeves were cut into 5-inch long segments, weighed, and then soaked in ethanol solutions of the following reaction products for 20 minutes. The sections of sleeve were then dried in the air for about sixteen hours, weighed to determine the pickup of the reaction product and then exposed to three cycles of 80 pphm ozone at 104°F., and a relative humidity of at least 95%.

The solutions, the amount of coating and the result of 3 cycles of ozone exposure are listed below:

|   |   | % Pickup | ΔE |
|---|---|---|---|
| a) | Control in 200 ml ethanol | 0 | 10.7 |
| b) | Product of reaction 1a, largely $(CH_3)_2N-CH_2CHOH(CH_2)_4CHOHCH_2N(CH_3)_2$ | 1.68 | 1.6 |

A cycle is that amount of exposure which occurs when a nylon control fabric shows a specified color change as measured by a colorimeter.

The control fabric is a nylon sleeve dyed Olive I, a tertiary shade given by a dyebath containing 0.69% (O.W.F.) Disperse Blue 3, (such as Celliton Blue FFRN), 0.0807% (O.W.F.) Celliton Pink RF, and 0.465% (O.W.F.) Celliton Yellow GA. Disperse Blue 3 dye is especially sensitive to ozone.

The degree of fading after exposure to ozone was measured on a Hunter Color Difference Meter. The measurement is given in terms of ΔE units, a smaller ΔE being associated with less fading.

ΔE is calculated from the differences between the L, a, and b readings before the yarn is exposed to ozone, and the L, a, and b readings after the yarn is exposed to ozone, using the equations:

$$\Delta E = \sqrt{(\Delta L)^2 + (\Delta a)^2 + (\Delta b)^2}$$

L is a 0–100 reading of black to white; a measures redness to greenness; and b measures yellowness to blueness.

The Hunter Color Difference Meter is believed to measure color, as seen in average daylight, in a manner similar to the way in which the human eye responds to color. Experimentation has shown that the eye can match any color with a combination of three "primary" colored lights, and therefore, that any color can be specified by a three-dimensional identification. The Color Difference Meter measures the light reflected by a specimen through filters that correspond to the three primary lights. The measurements made, therefore, correspond to the way the average human eye responds to light, as these responses are set forth in the CIE "Standard Observer". The "Standard Observer" is a table of values derived from experiments with human observers, and recommended for use in 1931 by the International Commission on Illumination.

EXAMPLE 9

Light dyeing polycaprolactam was made having a formic acid relative viscosity (FAV) of about 67. The polymer had about 70 gram-equivalents of carboxyls and about 17 gram-equivalents of amines per $10^6$ grams of polymer. The polymer was spun, plied, drawn, chopped into staple, carded and spun into staple yarn and autoclaved by steaming in an autoclave at 230°C. for 5 minutes, followed by 3 ten-minute cycles of steam treatment at 260°F. This steam treatment is used to simulate the twist setting that such yarns receive when they are used in shag carpets, for example.

The autoclaved yarns were dyed Olive I whose dyebath recipe is described in Example 11.

The dyed yarns were coated with solutions of the chemicals given below, and tested, and the fading was measured in the same manner as described in Example 11.

The solutions, the amount of coating and the results of 3 cycles of ozone exposure was listed below:

| Solution in 200 ml ethanol | % Pickup | ΔE |
|---|---|---|
| a) 1 gm product of reaction 1e | 1.9 | 1.8 |
| b) 2 gms product of reaction 1e | 3.1 | 5.7 |
| c) 1 gm product of reaction 3a | 1.6 | 4.2 |
| d) 2 gms product of reaction 3a | 2.7 | 3.6 |
| e) 4 gms product of reaction 3a | 5.1 | 2.8 |
| f) 1 gm product of reaction 1d | 1.1 | 7.0 |
| g) 2 gms product of reaction 1d | 2.4 | 5.9 |
| h) 4 gms product of reaction 1d | 4.6 | 4.6 |
| i) Control, just 200 ml ethanol | 0 | 21.4 |

EXAMPLE 10

Sleeves from the same yarn as described in Example 8 but autoclaved at 260°F. as described in Example 9 were cut into sections, soaked in the following solutions and then exposed to 3 cycles of ozone using the methods described in Example 8.

| Solution in 200 ml ethanol | % Pickup | ΔE |
|---|---|---|
| a) 0.8 gm product of reaction 1e | 0.15 | 10.4 |
| b) 1.5 gms product of reaction 1e | 1.9 | 7.6 |
| c) 3.0 gms product of reaction 1e | 3.2 | 1.7 |
| d) 0.8 gm product of reaction 2a | 0.64 | 4.2 |
| e) 1.5 gms product of reaction 2a | 2.1 | 1.0 |
| f) 3.0 gms product of reaction 2a | 3.7 | 1.0 |
| g) just 200 ml ethanol | 0 | 24.1 |

EXAMPLE 11

Sleeves from the same yarn as described in Example 8, except that it was autoclaved at 280°F. prior to dyeing, were cut into sections, soaked in the following solutions, and then exposed to three cycles of ozone using the methods described in Example 8.

| Solution in 200 ml ethanol | % Pickup | ΔE |
|---|---|---|
| a) 1 gm product of reaction 3c | 1.04 | 14.2 |
| b) 1 gm product of reaction 2b | 1.74 | 11.5 |
| c) 2 gms product of reaction 2b | 3.2 | 2.3 |
| d) 1 gm product of reaction 1a | 2.1 | 3.5 |
| e) 2 gms product of reaction 1a | 3.6 | 5.2 |
| f) 1 gm product of reaction 3d | 1.4 | 8.6 |
| g) 2 gms product of reaction 3d | 2.5 | 5.2 |
| h) 1 gm product of reaction 2c | 1.6 | 6.1 |
| i) 2 gms product of reaction 2c | 2.7 | 3.1 |
| j) Control, just 200 ml ethanol | 0 | 34.8 |

EXAMPLE 12

Sleeves identical to those of Example 11 were cut into sections, soaked in the following solutions and then exposed to ozone using the methods of Example 8.

| Solution in 200 ml ethanol | % Pickup | ΔE |
| --- | --- | --- |
| a) 1 gm product of reaction 3b | 2.1 | 6.6 |
| b) 2 gms product of reaction 3b | 3.0 | 2.6 |
| c) 1 gm product of reaction 2d | 1.9 | 3.3 |
| d) 2 gms product of reaction 2d | 3.7 | 1.0 |
| e) 2 gms product of reaction 3c | 2.6 | 3.7 |
| f) Control, just 200 ml ethanol | 0 | 31.2 |

EXAMPLE 13

Sleeves identical to those of Example 10 were cut into sections, soaked in the following solutions and then exposed to ozone using the method of Example 8.

| Solution in 200 ml ethanol | % Pickup | ΔE |
| --- | --- | --- |
| a) 1 gm product of reaction 3e | 1.4 | 3.3 |
| b) 2 gms product of reaction 3e | 2.7 | 3.3 |
| c) 1 gm product of reaction 2e | 1.6 | 4.8 |
| d) 2 gms product of reaction 2e | 1.8 | 2.1 |
| e) Control, just 200 ml ethanol | 0 | 22.0 |

EXAMPLE 14

Sleeves identical to those of Example 10 were cut into sections, soaked in the following solutions, and then exposed to ozone using the method of Example 8.

| Solution in 200 ml ethanol | % Pickup | ΔE |
| --- | --- | --- |
| a) 1 gm product of reaction 1c | 1.1 | 4.8 |
| b) 2 gms product of reaction 1c | 2.0 | 2.9 |
| c) Control, just 200 ml of ethanol | 0 | 20.4 |

EXAMPLE 15

Sleeves identical to those of Example 10 were cut into sections, soaked in the following solutions and then were exposed to ozone as in Example 8.

| Solution in 200 ml ethanol | % Pickup | ΔE |
| --- | --- | --- |
| a) 1 gm product of reaction 6a | 1.3 | 3.5 |
| b) 2 gms product of reaction 6a | 2.9 | 3.8 |
| c) 1 gm product of reaction 6b | 1.5 | 4.8 |
| d) 2 gms product of reaction 6b | 2.6 | 3.4 |
| e) 1 gm product of reaction 7c | 1.5 | 7.5 |
| f) 2 gms product of reaction 7c | 3.0 | 4.8 |
| g) Control, just 200 ml ethanol | 0 | 23.9 |

EXAMPLE 16

Sleeves identical to those of Example 10 were treated as in Example 8 after soaking in the following solutions.

| Solution in 200 ml ethanol | % Pickup | ΔE |
| --- | --- | --- |
| a) 1 gm product of reaction 8 | 1.3 | 10.6 |
| b) 2 gms product of reaction 8 | 2.5 | 11.5 |
| c) 1 gm product of reaction 1g | 1.7 | 5.2 |
| d) 2 gms product of reaction 1g | 3.2 | 2.6 |
| e) Control, just 200 ml ethanol | 0 | 23.9 |

EXAMPLE 17

Sleeves identical to those of Example 10 were treated except that they were autoclaved at 270°F. The sleeves were cut into sections, soaked in the following solutions, and then exposed to ozone as in Example 8.

| Solution in 200 ml ethanol | % Pickup | ΔE |
| --- | --- | --- |
| a) 1 gm product of reaction 2j | 2.3 | 2.1 |
| b) 1 gm product of reaction 3f | 2.5 | 3.3 |
| c) 1 gm product of reaction 3g | 1.9 | 3.8 |
| d) 1 gm product of reaction 3h | 1.5 | 4.1 |
| e) 1 gm product of reaction 3i | 2.2 | 3.4 |
| f) 1 gm product of reaction 3j | 1.5 | 5.2 |
| g) Control, just 200 ml ethanol | 0 | 26.7 |

EXAMPLE 18

Sleeves identical to those of Example 17 were cut into sections, soaked in the following solutions, and then exposed to ozone as in Example 8.

| Solution in 200 ml ethanol | % Pickup | ΔE |
| --- | --- | --- |
| a) 1 gm product of reaction 3k | 1.7 | 1.9 |
| b) 1 gm product of reaction 3l | 2.0 | 2.9 |
| c) 1 gm product of reaction 4c | 0.8 | 3.6 |
| d) 1 gm product of reaction 4d | 2.1 | 1.7 |
| e) Control, just 200 ml ethanol | 0 | 27.1 |

EXAMPLE 19

Sleeves identical to those of Example 10 were cut into sections, soaked in the following solutions, and then exposed to ozone, as in Example 8.

| Solution in 200 ml ethanol | % Pickup | ΔE |
| --- | --- | --- |
| a) 1 gm product of reaction 4a | 0.5 | 4.2 |
| b) 1 gm product of reaction 2g | 1.3 | 1.4 |
| c) 1 gm product of reaction 2f | 1.3 | 2.8 |
| d) 1 gm product of reaction 4e | 1.2 | 3.6 |
| e) 1 gm product of reaction 4b | 1.2 | 1.8 |
| f) 1 gm product of reaction 2h | 1.3 | 1.7 |
| g) 1 gm product of reaction 2i | 1.4 | 1.6 |
| h) Control, just 200 ml ethanol | 0 | 21.5 |

EXAMPLE 20

Sleeves identical to those of Example 9 were cut into sections, soaked in the following solutions, and then exposed to ozone, as in Example 8. The results are listed below.

| Solution in 200 ml ethanol | % Pickup | ΔE |
|---|---|---|
| a) 1 gm product of reaction 1f | 1.8 | 3.2 |
| b) 1 gm product of reaction 2a | 1.7 | 3.9 |
| c) 1 gm product of reaction 3c | 1.4 | 10.6 |
| d) 1 gm product of reaction 1a | 1.4 | 4.7 |
| e) 1 gm product of reaction 2c | 1.0 | 5.9 |
| f) 1 gm product of reaction 3e | 0.8 | 9.2 |
| g) 2 gm product of reaction 3e | 2.6 | 5.5 |
| h) Control, just 200 ml ethanol | 0 | 27.8 |

EXAMPLE 21

Sleeves identical to those of Example 17 were cut into sections, soaked in the following solutions and then exposed to ozone as in Example 8. The coatings and the results of exposure are listed below.

| Solution in 200 ml ethanol | % Pickup | ΔE |
|---|---|---|
| a) 0.8 gm product of reaction 3g | 1.18 | 10.4 |
| b) 1.2 gms product of reaction 3g | 1.78 | 5.7 |
| c) 2.0 gms product of reaction 3g | 2.85 | 4.5 |
| d) 0.8 gm product of reaction 3m | 0.95 | 8.3 |
| e) 1.2 gms product of reaction 3m | 1.76 | 5.6 |
| f) 2.0 gms product of reaction 3m | 2.78 | 8.2 |
| g) 0.8 gm product of reaction 3n | 1.30 | 8.9 |
| h) 1.2 gms product of reaction 3n | 2.00 | 10.3 |
| i) 2.0 gms product of reaction 3n | 3.04 | 4.5 |
| j) 0.8 gm product of reaction 3o | 1.08 | 9.2 |
| k) 1.2 gms product of reaction 3o | 1.77 | 5.7 |
| l) 2.0 gms product of reaction 3o | 2.95 | 10.4 |
| m) Control, just 200 ml ethanol | 0 | 30.0 |

EXAMPLE 22

Sleeves identical to those of Example 17 were cut into sleeves, soaked in the following solutions and then exposed to ozone as in Example 8. The coatings and the results of exposure are listed below.

| Solution in 200 ml ethanol | % Pickup | ΔE |
|---|---|---|
| a) 1 gm product of reaction 6 | 1.9 | 5.5 |
| b) Control, just 20 ml ethanol | 0 | 27.0 |

EXAMPLE 23

The procedure of Example 11 was repeated but using cationic dyeable nylon 6,6 staple (Du Pont T367) instead of cationic dyeable polycaprolactam. The antiozonants used, the amount of pickup of the antiozonant and the result of 3 cycles of ozone exposure are listed below:

| Solution in 200 ml ethanol | % Pickup | ΔE |
|---|---|---|
| Control, soaked in 200 ml ethanol | 0 | 4.2 |
| a) 0.8 gm product of reaction 2a | 0.7 | 1.1 |
| b) 1 gm product of reaction 3d | 1.1 | 1.5 |
| c) 1 gm product of reaction 5b | 0.8 | 0.6 |

I claim:

1. A composition of matter comprising from about 92 to about 99.9% by weight of a polycarbonamide and from about 0.1 to about 8% by weight of a compound coated on said polycarbonamide selected from the group consisting of compounds having at least two

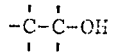

groups attached to nitrogen atoms and created by the reaction of

A. a polyepoxide with a secondary alkyl amine,
B. a diepoxide with a primary alkyl monoamine and/or ammonia and/or a secondary alkyl amine.

2. The composition of claim 1 wherein said compound is created by the reaction of a diepoxide with a secondary alkyl amine.

* * * * *